Dec. 7, 1926.

H. PELOQUIN 1,609,829

HAY COCKING MACHINE

Filed April 21, 1923    3 Sheets-Sheet 1

Inventor
By H. PELOQUIN
Attorney

Dec. 7, 1926. 1,609,829
H. PELOQUIN
HAY COCKING MACHINE
Filed April 21, 1923   3 Sheets-Sheet 2

Inventor
H. PELOQUIN
By
Attorney

Dec. 7, 1926.
H. PELOQUIN
1,609,829
HAY COCKING MACHINE
Filed April 21, 1923   3 Sheets-Sheet 3
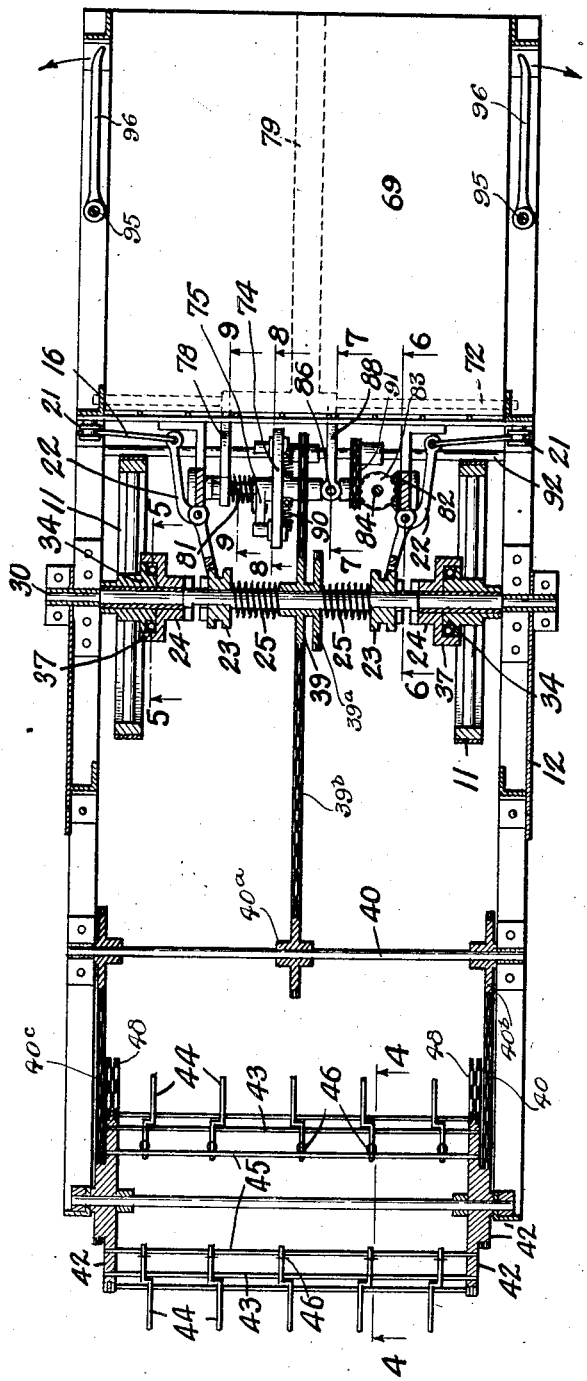
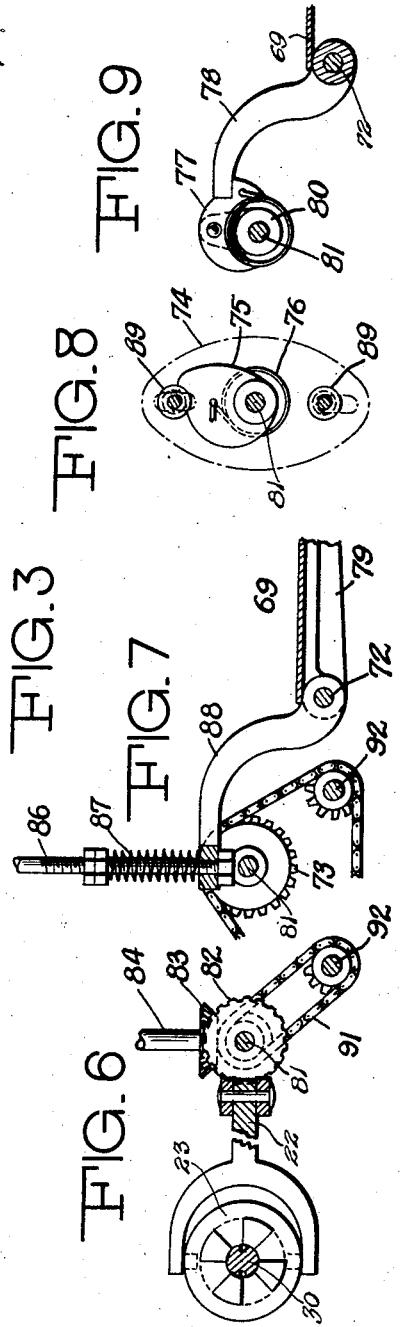
Inventor
H. PELOQUIN
By
Attorney Patented Dec. 7, 1926.

1,609,829

UNITED STATES PATENT OFFICE.

HECTOR PELOQUIN, OF VILLE MARIE, QUEBEC, CANADA.

HAY-COCKING MACHINE.

Application filed April 21, 1923. Serial No. 633,622.

This invention relates particularly to automatic means for cocking or stacking hay and the like, and the principal object is to automatically perform this work in one operation, after the hay has been mowed. A further object is to provide a machine of this character that will automatically, economically and positively obtain such results, which are now obtained mainly by hand labor.

Referring to the drawings:—

Figure 3 is a longitudinal section on line 3—3 of Figure 1.

Figure 6 is a vertical section on line 6—6 of Figure 3.

Figure 7 is a vertical section on line 7—7 of Figure 3.

Figure 8 is a vertical section on line 8—8 of Figure 3.

Figure 9 is a vertical section on line 9—9 of Figure 3.

Figure 10 is a vertical section on line 10—10 of Figure 2.

Like numerals of reference indicate corresponding parts in each figure.

Figure 1:
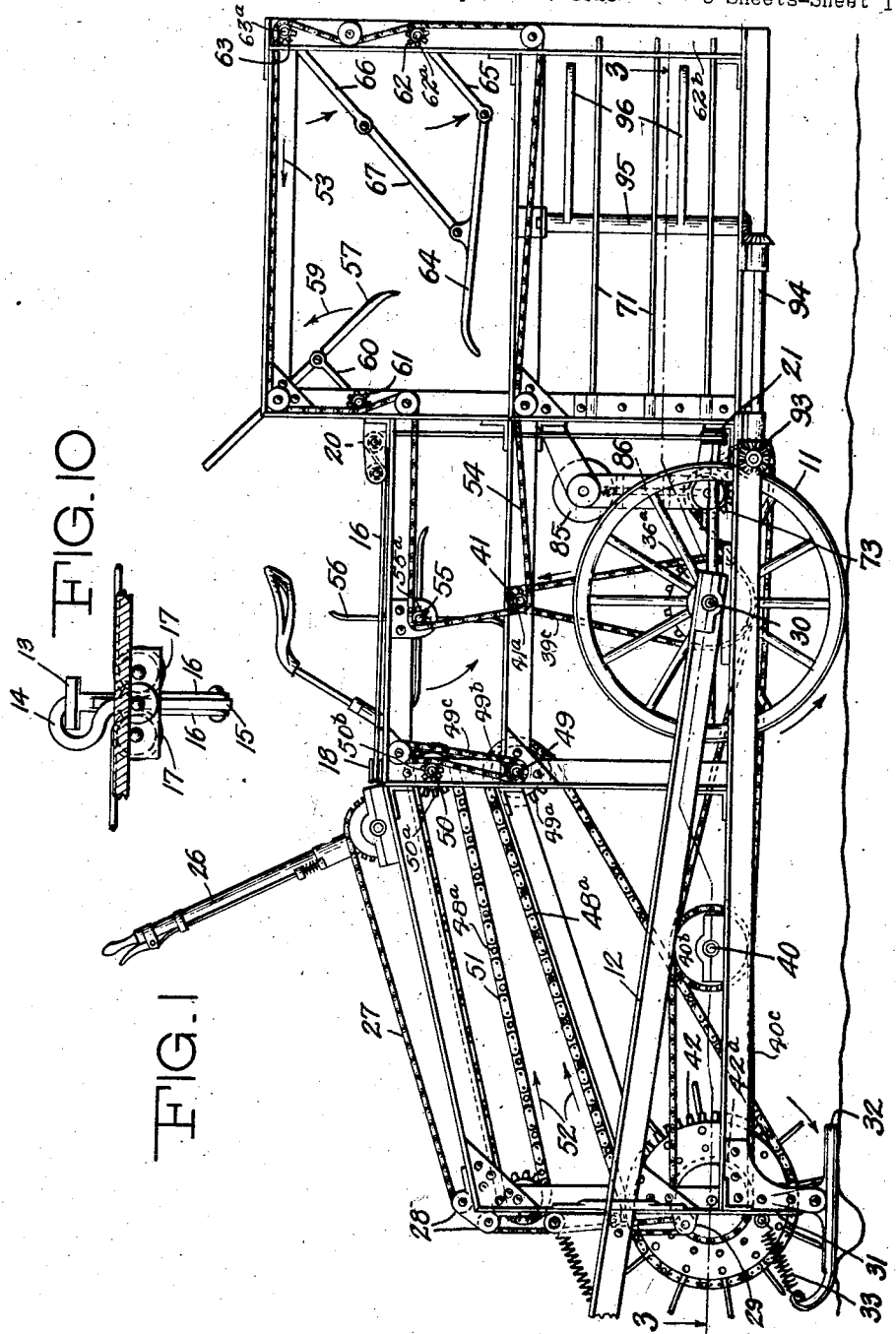
Figure 1 illustrates the complete machine in side elevation.

This machine is mounted on a pair of wheels 11 and is adapted to be drawn by a horse or a team of horses harnessed to the beams 12 or by any other suitable means.

When the machine is being drawn, but the mechanism is not in operation, a foot lever 13 is held in locked position, as shown by a catch 14. To this lever 13 is perpendicularly formed an extension 15 to the extremity of which are attached the ends of two steel wires 16 passing over two pulleys 17 and operating in opposite directions to each other so that both wires after passing around pulleys 18 which are placed at both sides of the machine, run along the sides 19, of the frame work of the machine, around pulleys 20 and then down vertically and around pulleys 21. The ends of the wires are secured to two levers 22 which are placed and operated towards one another, the ends of the wires 16 being attached to the rear ends of these levers 22. The front ends of levers 22 are forked and have bearings formed into two clutches 23 which engage with clutch portions of the wheel clutch members 24, as shown, the clutches being disengaged upon the release of the foot lever 13 from the catch 14, the immediate engaging of this clutch action being effected under the pressure of the springs 25.

Also, for the purpose of driving while the mechanism is idle and in turning around, the front end of the machine may be raised from the ground through a hand lever 26 actuating chains 27, which are placed at each side of the machine and are conveniently guided over rollers 28 and pass downwardly therefrom and around the under sides of pulleys 29 which are mounted below the beams 12 and then up to the said beams to which the ends of the chains are fixed. In pulling back the lever 26, it will readily be seen that the entire front portion of the machine will be raised and thus hang from the beams 12 which are pivotally mounted on the axle 30 of the wheels 11.

I provide the front supports 31 of the machine with pivotally mounted skates 32 for the purpose of passing over depressions in the ground, such as gutters, thus maintaining the machine nearly parallel to the ground. The skates 32 are provided with retaining springs 33, which yieldably support the front ends of the skates when the front end of the machine is raised.

Figure 2:
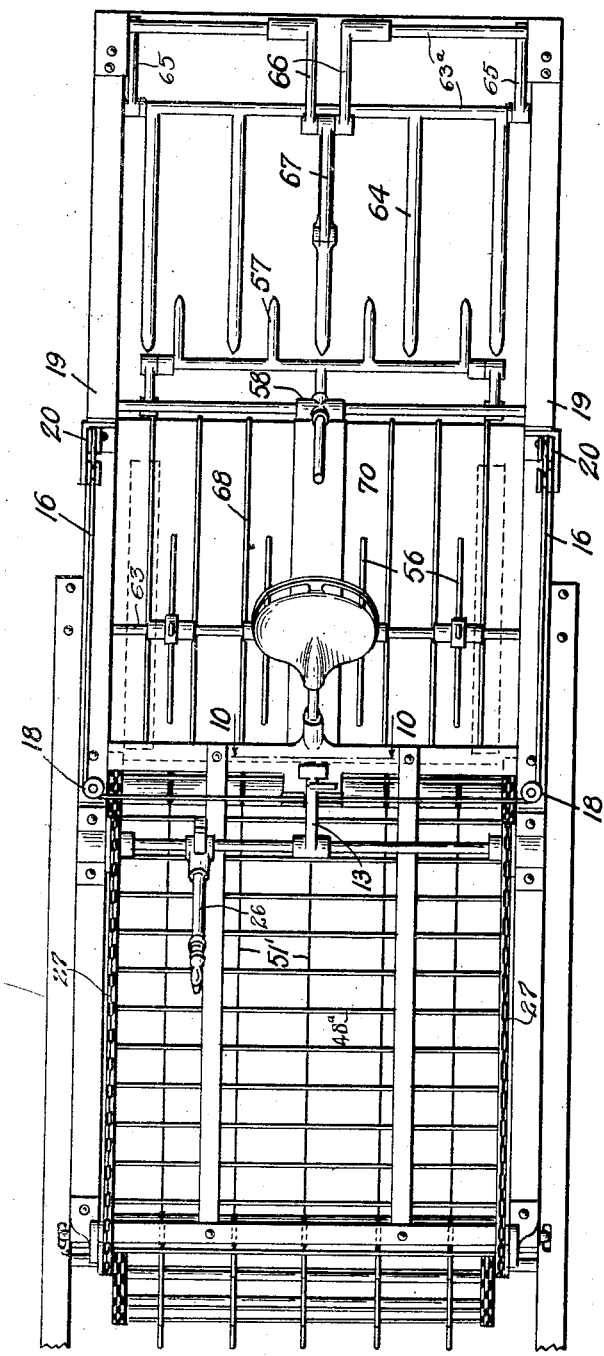
Figure 2 is a top plan of the same.
Figure 5:
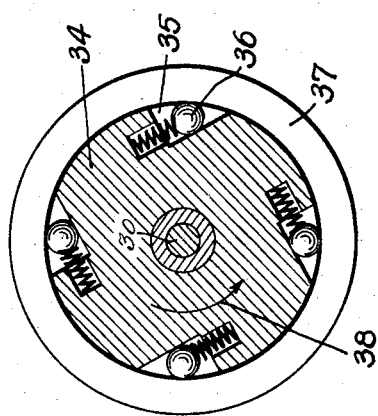
Figure 5 is a vertical section on line 5—5 of Figure 3.
Figure 4:
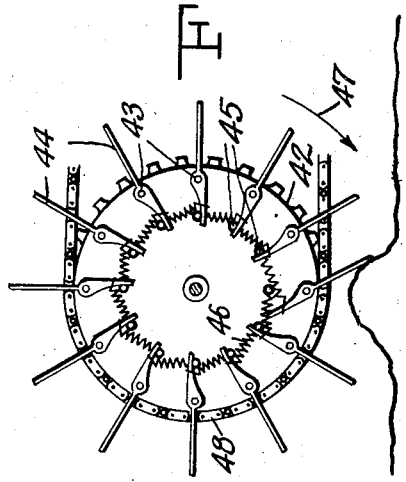
Figure 4 is a vertical section on line 4—4 of Figure 3.

The power transmission for the cocking mechanism is obtained through the medium of the wheels 11 mounted on the axle 30 and the clutch members 24. The hub of the wheel 34 is provided with cut away portions 35 adapted to retain a ball or roller 36 forced by a spring so that the tapering of the cut away portion 35 jams the roller 36 against the inside of the flange 37 of the clutch member 24, when the wheel rotates in the direction of the arrow 38. The wedge-like action of the rollers does not take effect when the machine is going backwards, so that the cocking mechanism is actuated only while the wheels are in forward motion. Fixed to axle 30 is a pair of sprockets 39, 39$^a$. Wheel 39 transmits its motion by an endless chain 39$^b$ to a sprocket wheel 40$^a$ which is fastened on a shaft 40. The sprocket wheel 39$^a$ transmits motion by an endless chain 39$^c$ and a sprocket wheel 39$^d$ (indicated in dotted lines in Figure 1)

to a shaft 41. Secured to the shaft 40 near opposite sides of the machine are sprocket wheels 40$^b$ which, in turn, by endless chains 40$^c$ and sprocket wheels 42' actuate a picking roller placed at the extreme front of the machine. This picking roller comprises a large sprocket wheel 42 on both sides, integral with the actuating sprockets 42', and securely held to them are a number of rods 43 on each of which are pivotally mounted several picking fingers 44 equally spaced from one another. These fingers 44 extend outwardly and are offset slightly from their bearing, thus projecting inwardly and abutting against rods 45 which are equal in number to the rods 43 to which are fastened springs 46 for retaining the abutted projecting ends of the fingers 44. Figure 4 illustrates the action of the springs 46 upon the fingers 44 when the picking roller passes over an obstacle, the movement of the picking roller being in the direction of the arrow 47, and the fingers giving way over the obstacle and immediately after returning to their normal working position. A chain 48 actuated by the sprockets 42 runs on an incline towards the center of the machine actuating in its turn a shaft 49 through sprocket wheels 49$^a$. Shaft 49 transmits its motion by a sprocket wheel 49$^b$ to an endless chain 49$^c$ and thence to a journalled shaft 50 through a sprocket wheel 50$^b$ on said shaft. Another sprocket wheel 50$^a$ is mounted on each side of the machine on which is mounted a chain 51 running downwardly on an incline to the front support of the machine. Chains 48 and 51 are both actuated in the direction of arrows 52 and are set apart so that they taper towards the center of the machine at equal distances, and rods 48$^a$ are set in between each pair of chains 48 and 51 as shown in Fig. 2, thus forming a carrier-apron of the chain 48 and a pressing apron of the chain 51. Also mounted immediately inside the line of rods carried by chains 51 is a series of flexible wires 51$^1$ running longitudinally with the machine, and carried around drums fixed to the actuating shafts of the chains 51. Mounted on the shaft 41 on both sides of the machine is a small sprocket wheel 41$^a$, transmitting motion in the direction of arrow 53 to chains 54 which actuate a shaft 55 by engagement with a sprocket wheel 55$^a$ on said shaft. A series of picking wires 56 placed immediately after the carrier and pressing aprons are mounted on the shaft 55. Towards the rear and immediately after the circular picking wires 56 is provided a fork 57 slidably mounted into a pivoted bearing 58 and actuated in the direction of arrow 59 by means of chain 54 and arms 60 which are fixedly connected to sprockets 61. The rear end of fork 64 is pivotally connected to arms 65 of a shaft 62$^a$ which is mounted in bearings in the vertical uprights 62$^b$ at the rear end of the machine. Said shaft has sprockets 62 which are engaged by the chains 64.

A shaft 63$^a$ is mounted in bearings at the upper ends of said members 62$^b$ and has sprocket wheels 63 which are also engaged by the chains 54. Said shaft has a pair of crank arms 66 to which is pivotally connected a link 67, said link being pivotally connected at its lower end to the central tine of the fork 64 at a point about midway the length of said tine. The arms 65 and the crank 66 revolve in the direction of the indicating arrow (see Figure 1) and the link 67 supports the fork 64 which transmits to the same the aforesaid motion.

The picking fingers 44 which raises the cut hay or the like from the ground delivers it upon the carrier apron and is compressed by the pressing apron and then delivered upon a flooring formed of longitudinal rods 68 between which the picking wires 56 advance the said hay in small quantities towards the fork 57 which in turn advances the picked mass towards the rear space of the machine where the fork 64 immediately flattens, presses and stacks the mass on a floor 69. The fingers of the fork 57 pass in between the rods 68 and the fingers of the fork 64. A slight distance below the rods 68 and passing over the actuating means of the shaft 41 is a protective covering 70 which may be made of sheet metal covering the entire mechanism below. The longitudinal rods 68 in line with the axis of the fork 57 where the covering 70 ends, are turned down vertically and form a wall for the stacking space above the floor 69. On opposite sides of the machine are horizontally arranged suitably spaced rods 71 which prevent the hay on the floor 69, and destined to form a cock, from falling out through the sides of the cock forming chamber as will be understood.

Placed in proximity to the front of the floor 69 is the delivering mechanism for lowering the rear of the floor 69 which is pivotally mounted on a shaft 72. This mechanism consists primarily of a sprocket 73, working in unison with the axle 30, and integral with an oblong roller bearing plate 74 which engages a cam 75 to which is fixed one end of a coil spring 76 fastened at its other end to a locking plate 77 engaging with an S-shaped member 78 integral with the pivoting support 79 of the floor 69. A lever 80 fixed upon the shaft 81 upon which is mounted this entire mechanism, carries the plate 77 which straddles an extending hub of the said lever 80 and is oscillated for the purpose of absorbing sudden or great shocks from the locking of the member 78 with the plate 77. Fixed to the shaft 81 is a bevel gear 82 engaging another bevel gear 83 fixedly mounted to an upright shaft 84 at the top of which is similarly disposed a pair of bevel gears upon the horizontal bearing of which is fixed a pitman bearing member 85. This pitman bearing is in the form of a vertically disposed rod 86, the lower end of which is threaded for the purpose of adjusting the desired pressure upon a spring 87 bearing on top of another S-shaped member 88, also integral with the support 79, this adjustment spring 87 regulating the pressure of the fork 64 in cocking.

It will readily be understood that there may be differences causing the earlier or retarded action of the compression of the spring 87, these differences being due to the various conditions of weight upon the floor 69, as compared to the pressure exercised by the fork 64, etc., and for this purpose since the action of the spring 76 is due to a constant torque by the cam 75, the plate 74 is rendered flexible to the demand of the permissible strain upon the spring 76 carried by the plate 74, and at each end is a roller 89 slidably mounted in a slot and held by a spring 90 having a compressed strength almost equal to the torque strength of the spring 76. One of the rollers 89 fits into a coinciding depression of the cam 75 and will only be displaced therefrom and over the head of the cam, by the greater strain on the spring 76 when the other roller 89 will come into operation to act as the driving means of the cam 75. Almost mounted fixedly to the shaft 81 is a driving means 91 actuating a shaft 92 placed immediately in front of the shaft 72 having a bevel gear 93 mounted at each end to the sides of the machine, and actuating a driving member 94 controlling an upright shaft 95. This shaft has arms 96 thereon revolving horizontally in the direction of the indicating arrows, between the rods 71 for the purpose of pushing the mass of hay or such off the floor 69 when same is cocked.

What I claim as my invention is:—

1. In a hay cock machine a frame, raking means at one end thereof, conveying means fed by the raking means, and cocking means fed by the conveying means, said cocking means including a thrusting fork and means to cause said fork to move in a vertical plane through the path of the lower ends of its tines and thereby exert downward thrusts on the hay and also comprising a compressing fork arranged in substantially horizontal position and means to cause said compressing fork to describe vertical oscillating motion, and driving means for said raking means, conveying means and fork operating means.

2. In a hay cocking machine a frame forming a cocking chamber, a pivotally mounted floor for said chamber, a thrusting fork, a revoluble shaft having a crank arm connected to said fork at a point intermediate the ends of said fork, a swinging guide element for said fork, means to operate said shaft, a compressing fork arranged in rear of and below the first named fork, a revoluble shaft having arms connected to the rear end of the compressing fork, a second revoluble shaft having arms, a link connecting said arms to said fork at a point substantially midway between the ends of said fork, means to operate said shafts, and means to lower the free end of said floor.

3. A cocking machine comprising a frame forming a cocking chamber open at one side, means to convey hay to the opposite side of said chamber, thrusting means at side of said chamber to which the hay is conveyed, compressing means in rear of is conveyed, compressing means in rear of said thrusting means, and means for forcing said hay from said chamber through said open side thereof.

4. A cocking machine comprising a frame forming a cocking chamber open at one side, means to convey hay to the opposite side of said chamber, thrusting means at the side of said chamber to which the hay is conveyed, compressing means in rear of said thrusting means, and means for forcing said hay from said chamber through said open side thereof, said forcing means comprising vertical shafts arranged at opposite sides of said chamber and arms extending horizontally from said shafts, said opposite sides of said chamber having openings for the passage of said arms, and means to operate said thrusting mechanism, said compressing mechanism and said vertical shafts.

5. A cocking mechanism comprising a frame; a floor pivotally mounted in said frame; a fork for compressing and stacking the material upon said floor; driving means for said fork; means for automatically lowering the free end of said floor; and means for forcing the cocked material from the floor to the ground.

Signed at Montreal, Quebec, Canada, this 26th day of March, 1923.

HECTOR PELOQUIN.